Sept. 7, 1948.  S. R. STRADER  2,448,744
TRACTOR-TRAILER COUPLING DEVICE
Filed April 26, 1946
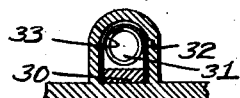
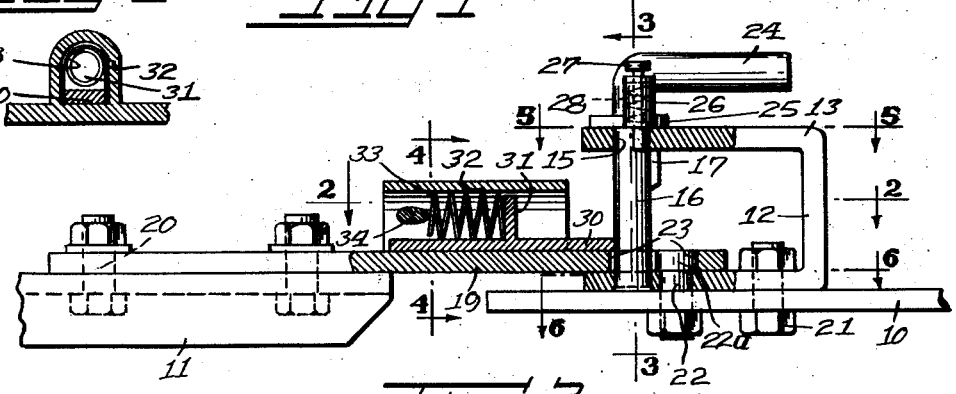
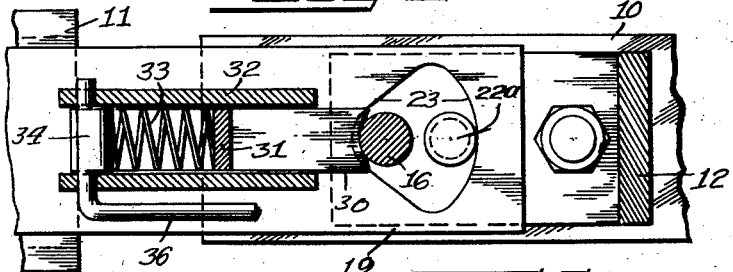
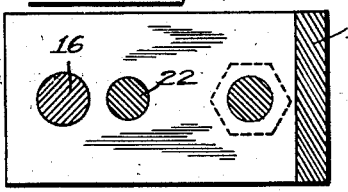
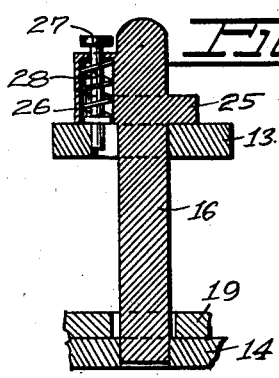
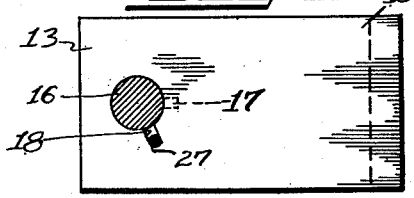
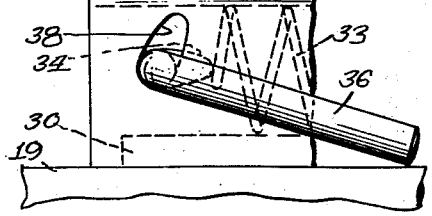
INVENTOR.
Spencer R. Strader
BY
Wilfred Lawson
Attorney Patented Sept. 7, 1948

2,448,744

UNITED STATES PATENT OFFICE 2,448,744

TRACTOR-TRAILER COUPLING DEVICE

Spencer R. Strader, Hanford, Calif.

Application April 26, 1946, Serial No. 665,679

7 Claims. (Cl. 280—33.15)

The present invention relates to a so-called "trailer hitch," that is, a device for connecting a tractor or other self-propelled vehicle to a trailing vehicle, which device is flexible in all directions without rattling to form a very secure attachment and which can be manufactured at low cost.

My trailer hitch is provided with a clevis or a pair of open jaws permitting different angular positions in all directions between tractor and trailer, without slack or rattling at any time. It is very easy to assemble and assures constant pull or tension between the assembled parts, which are yieldably connected.

The following objects and advantages of the trailer hitch should be noted: Safety, quick and easy hitching up and equally quick unhitching; elimination of all slack and rattling; complete limbering or toggle action without slack between tractor and trailer.

With these features in view the invention will be readily understood from the following description with the aid of the attached drawings being part of the application.

In the same, like numerals refer to the same details in the different views.

Figure 1 is a side elevational view in part section, of the assembled parts of the trailer hitch;

Figure 2 is a horizontal section of the drawbar, connecting the tractor with the trailer, taken on a plane along line 2—2 of Figure 1;

Figure 3 is a vertical section on a plane along line 3—3 of Figure 1;

Figure 4 is a vertical section taken along line 4—4 of Figure 1;

Figure 5 is a top plan view of the upper jaw with the key-hole shaped opening for the hitch bolt;

Figure 6 is a similar view of the bottom jaw of the clevis in part section;

Figure 7 is a fractional side view of a cam lever and sides.

Numeral 10 is the tail end of the motor car or tractor and numeral 11 is the front end of the trailer frame.

The tractor frame 10 has a clevis 12 with a straight upper jaw portion 13 directed parallel to the lower jaw portion 14, spaced above the latter, thus providing open jaws.

The upper jaw portion 13 has a bolt hole 15, which fits a connecting or hitch bolt 16 with a slight play between them. However, the hole 15 is provided with a radially, rearwardly directed slot 18 for a key 17 on the hitch bolt 16.

For the purpose of hitching the trailer portion or tongue 11 to the clevis 12 on the tractor 10, a drawbar 19, preferably made of flat band iron, is provided and securely bolted as at 20 on top of the front end 11 of the trailer, while the free end of the drawbar 19 is releasably held by the hitch bolt 16, The lower jaw 14 of the clevis 12 is fixed securely on the top of the tail end 10 of the tractor by means of screw bolts 21, 22 of which the head 22A of bolt 22 serves as a pivot pin for the drawbar 19. The forward end of this bar is for that purpose provided with a large hole 23, Figure 2, which engages not only the head 22a of screw bolt 22 but also the end of the connecting or hitch bolt 16. This hole 23 being widened rearwardly to permit free transverse displacement of said hitch bolt to give sufficient free movement or "toggle action" in all directions between the tractor and the trailer.

The upper jaw portion 13 of the clevis 12, as already stated, has a keyhole-shaped aperture 15 see Figure 3 with the side slot 18 for the upper part of the hitch bolt 16 and the bolt has a key 17 on the same side thereof as the lifting handle 24 at the top thereof. The key 17 is shown flat and straight with an inward bevel at the bottom to facilitate entry, and above the same, at a distance slightly more than the thickness of the clevis jaw portion 13, a circular collar 25 is provided on the hitch bolt 16. In a sleeve 26, secured on top of said collar, is furnished a latch pin 27, actuated by a spring 28, for axial displacement, so as to project below said collar 25 and thus engage in the key slot 18 of the hole 15 when the hitch bolt 16 is turned into engaging position.

In order to unhitch the trailer from the tractor, all that needs to be done is first to lift the latch pin 27 out of engagement with the key slot 18. This now permits the turning of the handle 24 until the key 17 registers with the slot 18 whereupon the hitch bolt 16 can then be drawn out and the tractor and trailer 10 and 11 separated.

So far as the invention has now been described, there still exists a possibility of rattling between the parts, because of the considerable amount of play existing in the drawbar hole 23 around the pivot bolt 22 and the hitch bolt 16 see Figure 2; and in order to overcome this rattling the following device is added.

This yielding device consists of a slide member 30 placed flatly on top of the free end of the drawbar 19, so as to be slidable back and forth thereon and is provided with an abutment lug 31 about midway thereof. A hood or housing 32 for said slide member 30 is provided on top of the drawbar 19 and integrally joined thereto as by welding. This hood 32 is open at both ends and contains a coiled compression spring 33, which, with its forward end abuts against the lug 31, while its rear end contacts with a cam member 34 and in this manner the spring 33 urges the slide 30 constantly forwardly towards the hitch bolt 16. The slide member 30 has for this purpose a concave front edge 35 abutting against the side of the hitch bolt and thus eliminates all loose play or rattling between the engaged parts.

The cam 34 forms a fixture on a cam lever 36 which is pivoted to turn in the housing 32 as at 37 and is inserted therein through a horizontal slot 38 in one side of the housing while held with the handle in a substantially horizontal position. When swung into vertical position or to the rear the lever 36 is prevented by the cam 34 itself from being drawn out.

With the cam handle 36 pointing forward as in Figure 1, and the cam 34 abutting against the spring, the trailer hitch or coupling is in locked position with the tractor. By swinging the cam lever 36 to the rear, the spring pressure against the slide 30 is released and accordingly the hold of bolt 16 by the slide 30 ceases.

The hitching or coupling between the two vehicles takes place in the following manner.

The hitching parts 10 and 11 are first placed in correct, relative position with the end of the drawbar 19 resting on the lower jaw 14 and the bolt hole 23 engaging the head of the pivot pin 22, while at the same time its rear portion is open for entering of the hitch bolt 16 through the hole 15 in the upper and lower jaws 13, 14, care being taken that the bolt key 17 registers with the slot 18. Previous to entering bolt 16 in the clevis 12, the clamp handle 36 is turned back, thus rotating the cam 34 to the rear in order to release the spring pressure on the slide 30, thus permitting the pushing of slide 30 out of the way of the hitch bolt 16.

In order to complete the locking of the hitch bolt 16 in the clevis, its handle is next turned forward into lengthwise direction of the tractor. As a consequence, the key 17 turns sideways away from the slot 18 with its top face under the bottom face of the upper jaw 13, thus preventing the jumping out of the hitch bolt. Simultaneously, the latch pin 27 snaps into the said slot 18, thus preventing the hitch bolt 16 from turning, thereby making its locking complete.

With the parts in this locked position and the clamp handle 36 to compress the spring to exert forward pressure of the slide against the hitch bolt 16, all rattling is eliminated, while still permitting "toggle action" between tractor and trailer.

It is to be understood that the invention as herein disclosed is not limited to the description and details shown, but that the same may be varied in accordance with the scope of the subjoined claims.

I claim:

1. A trailer hitch or coupling comprising a rearwardly directed fixed arm on a tractor vehicle and a forwardly directed arm on a trailer vehicle; a clevis member fixed on one of said arms and having an upper and lower jaw spaced apart, a hitch bolt adapted for entering axially aligned apertures in said jaws, a pivot pin fixed on the lower jaw, said other arm consisting of a drawbar being provided with a suitable opening for simultaneous engagement with said hitch bolt and said pivot pin, the rear edge of said opening being covered on the radius from the axis of said pivot pin and means for taking up slack between said hitch bolt and said arms.

2. A trailer hitch or coupling as described in claim 1, said means consisting of a yieldable slide member on the other of said arms adapted for constantly contacting with the peripheral surface of said hitch bolt.

3. A trailer hitch or coupling as described in claim 1, said means consisting of a yieldable slide member on the other of said arms provided with a concave surface shaped on the longer radius than that of the slide bolt, adapted for constantly contacting with the peripheral surface of said hitch bolt, a radial slot formed from the aperture in said upper jaw, a key on the side of the hitch bolt, a turning handle on the hitch bolt and a fixed collar below the handle at a distance above said key about equal to the thickness of the upper jaw; whereby upon insertion of the bolt through said jaw aperture and said key registering with said radial slot, the hitch bolt will be held from withdrawal after rotating the bolt until said key is out of registration with said slot.

4. The invention set forth in claim 1 wherein said means consists of a yieldable slide member on said drawbar adapted for constantly contacting with the peripheral surface of said hitch bolt, and a compression spring confined between fixed points on said slide member and said drawbar.

5. The invention set forth in claim 1 wherein said means consists of a yieldable slide member on said drawbar adapted for constantly contacting with the peripheral surface of said hitch bolt, and a compression spring confined between fixed points on said slide member and said drawbar; a fixed hood on the drawbar, forming a guide for said slide said compression spring acting between fixed points on the slide and the hood.

6. The invention set forth in claim 1 wherein said means consists of a yieldable slide member on said drawbar adapted for constantly contacting with the peripheral surface of said hitch bolt, and a compression spring confined between fixed points on said slide member and said drawbar; a fixed hood on the drawbar, forming a guide for said slide said compression spring acting between fixed points on the slide and the hood; a cam lever turnable in said hood adapted for increasing and decreasing the spring pressure.

7. A trailer hitch or coupling as described in claim 1, said means consisting of a yieldable slide member on the other of said arms adapted for constantly contacting with the peripheral surface of said hitch bolt, a radial slot formed from the aperture in said upper jaw, a key on the side of the hitch bolt, a turning handle on the hitch bolt and a fixed collar below the handle at a distance above said key about equal to the thickness of the upper jaw; whereby upon insertion of the bolt through said jaw aperture and said key registering with said radial slot, the hitch bolt will be held from withdrawal after rotating the bolt until said key is out of registration with said slot; a snap latch adapted for engaging in said slot when said key has been turned away therefrom, thereby latching the bolt in position and preventing tractor and trailer from unhitching.

SPENCER R. STRADER.

REFERENCES CITED

The following references are of record in the file of this patent:

UNITED STATES PATENTS

| Number | Name | Date |
| --- | --- | --- |
| 385,868 | McNab | July 10, 1888 |
| 2,140,132 | Hollett | Dec. 13, 1938 |